United States Patent
Lin et al.

(10) Patent No.: US 12,254,215 B2
(45) Date of Patent: Mar. 18, 2025

(54) MEMORY DEVICE AND MANAGEMENT METHOD THEREOF

(71) Applicant: MACRONIX International Co., Ltd., Hsinchu (TW)

(72) Inventors: Jia-Xing Lin, Hsinchu (TW); Nai-Ping Kuo, Hsinchu (TW); Shih-Chou Juan, Hsinchu (TW); Chien-Hsin Liu, Hsinchu (TW); Shunli Cheng, Hsinchu (TW)

(73) Assignee: MACRONIX International Co., Ltd., Hsinchu (TW)

(*) Notice: Subject to any disclaimer, the term of this patent is extended or adjusted under 35 U.S.C. 154(b) by 264 days.

(21) Appl. No.: 17/955,555

(22) Filed: Sep. 29, 2022

(65) Prior Publication Data

US 2024/0111453 A1    Apr. 4, 2024

(51) Int. Cl.
*G06F 3/06* (2006.01)
(52) U.S. Cl.
CPC .......... *G06F 3/0659* (2013.01); *G06F 3/0604* (2013.01); *G06F 3/0679* (2013.01)
(58) Field of Classification Search
CPC .... G06F 3/0659; G06F 3/0604; G06F 3/0679; G06F 3/0625
USPC .......................................................... 365/63
See application file for complete search history.

(56) References Cited

U.S. PATENT DOCUMENTS

| | | | |
|---|---|---|---|
| 5,555,420 | A | 9/1996 | Sarangdhar et al. |
| 6,192,425 | B1 | 2/2001 | Sato |
| 2022/0044752 | A1* | 2/2022 | Kim ............... G11C 29/021 |

FOREIGN PATENT DOCUMENTS

| | | |
|---|---|---|
| TW | I687868 | 3/2020 |
| TW | I695266 | 6/2020 |

OTHER PUBLICATIONS

"Office Action of Taiwan Counterpart Application", issued on May 24, 2023, p. 1-p. 4.

* cited by examiner

*Primary Examiner* — Huan Hoang
(74) *Attorney, Agent, or Firm* — J.C. PATENTS

(57) ABSTRACT

A memory device and a management method thereof are provided. The memory device includes a controller and at least one memory channel. The memory channel includes at least one memory chip. The at least one memory chip is commonly coupled to the controller through an interrupt signal wire. The at least one memory chip generates at least one local interrupt signal and performs a logic operation on the at least one local interrupt signal to generate a common interrupt signal. The interrupt signal wire is configured to transmit the common interrupt signal to the controller.

15 Claims, 12 Drawing Sheets

MEMORY DEVICE AND MANAGEMENT METHOD THEREOF

BACKGROUND

Technical Field

The disclosure relates to a memory device and a management method thereof, and in particular, to a memory device and a management method thereof capable of reducing controller load.

Description of Related Art

Nowadays, in the technical field, solid state disks have been widely applied in many different application fields. At present, in order to improve the performance and memory capacity of a solid state disk, a plurality of memory chips are often arranged in one memory channel in the technical field. In any case, it is not easy to identify the idle or busy status of each memory chip in the memory channel.

In the related art, the controller can read the idle or busy status of each memory chip by sending the status read command frequently. However, frequent reading of idle or busy statuses for each memory chip often causes the controller to be overloaded, so the performance of the controller is decreased, and the overall working performance of the memory device is affected.

SUMMARY

The disclosure provides a plurality of memory devices and management methods thereof capable of effectively decreasing overloading of a controller.

The disclosure provides a memory device including a controller and at least one memory channel. The memory channel includes at least one memory chips. The at least one memory chip is commonly coupled to the controller through an interrupt signal wire. The memory chips generate at least one local interrupt signals and performs a logic operation on the at least one local interrupt signal to generate a common interrupt signal. The interrupt signal wire is configured to transmit the common interrupt signal to the controller.

The disclosure provides another memory device including a controller and at least one memory channel. The controller has at least one command queue, wherein the at least one command queue records a plurality of operation commands and a plurality of operation completion times. The at least one memory channel is coupled to the at least one command queue and includes at least one memory chips. The controller, based on each of the operation commands which is executed, transmits a status read command to a corresponding selected memory chip according to each of the operation completion times.

The disclosure further provides a management method of a memory device, and the method includes the following steps. At least one memory chip is commonly coupled to a controller through an interrupt signal wire. The at least one memory chip generates at least one local interrupt signal. A logic operation is performed on the at least one local interrupt signal to generate a common interrupt signal. The interrupt signal wire transmits the common interrupt signal to the controller.

The disclosure further provides another management method of a memory device, and the method includes: setting at least one command queue to correspond to at least one memory channel, where the memory channel includes a plurality of memory chips; recording a plurality of operation commands and a plurality of operation completion times by the at least one command queue; and disposing a timer, setting the timer to perform a timing operation according to each of the operation command, and generating a time point for transmitting a status read command to a selected memory chip.

To sum up, each memory chip provided by the disclosure transmits its idle or busy status through a common interrupt signal. When the common interrupt signal indicates that at least one memory chip is idle, the controller inquires about the idle or busy status of each memory chip. In this way, overloading caused by the controller repeatedly querying the idle or busy statuses of the memory chips may be effectively reduced, and the working efficiency of the memory device may be improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
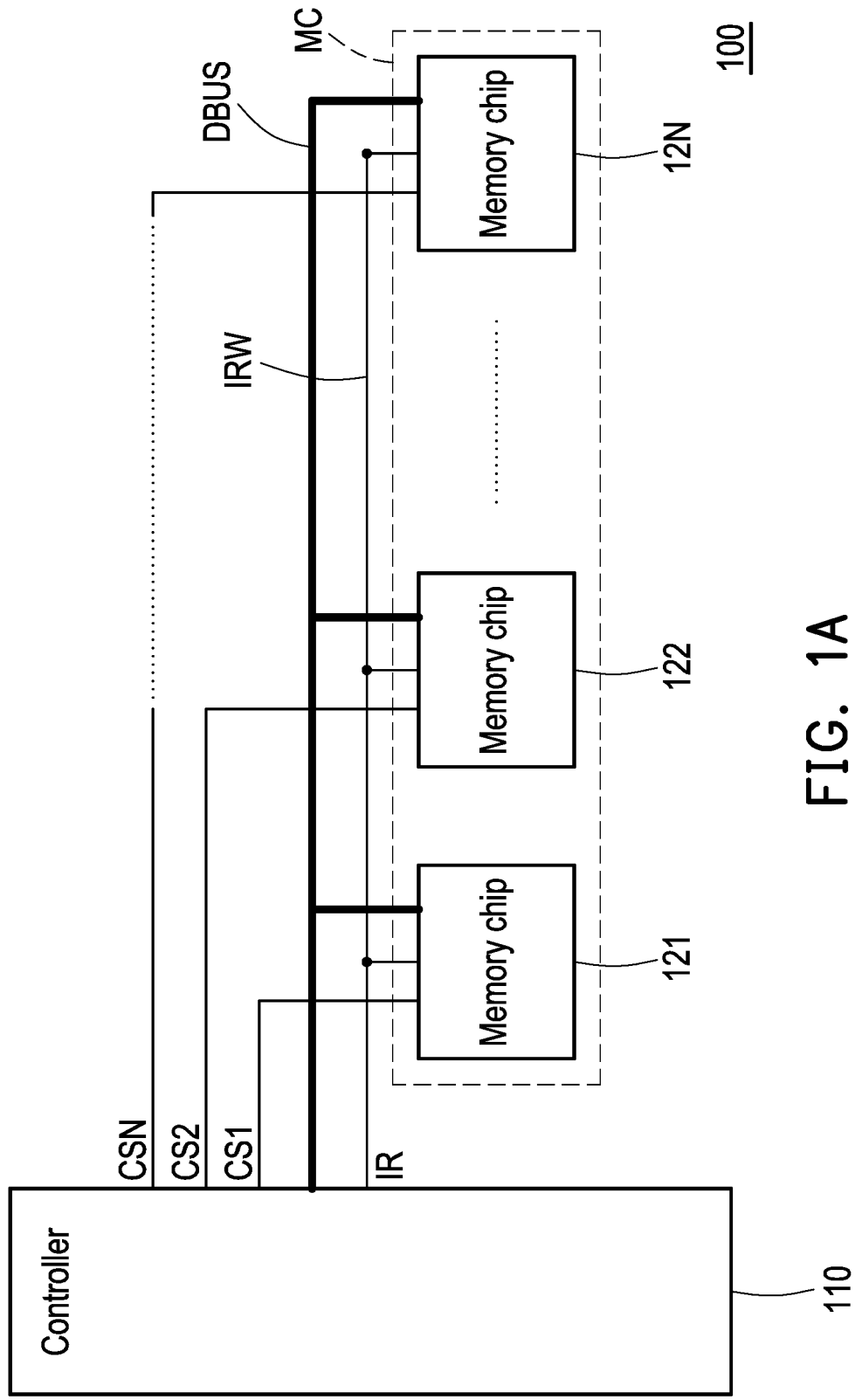
FIG. 1A is a schematic diagram illustrating a memory device according to an embodiment of the disclosure.

With reference to FIG. 1A, FIG. 1A is a schematic diagram illustrating a memory device according to an embodiment of the disclosure. A memory device 100 includes a controller 110 and a memory channel MC formed by a plurality of memory chips 121 to 12N. The memory chips 121 to 12N are commonly coupled to an interrupt signal wire IRW and are coupled to the controller 110 through the interrupt signal wire IRW. The memory chips 121 to 12N share a data bus DBUS to communicate with the controller 110. The controller 110 further transmits chip selection signals CS1 to CSN respectively to the memory chips 121 to 12N through a plurality of chip selection signal lines.

In this embodiment, a plurality of local interrupt signals may be generated inside the memory chips 121 to 12N. The memory chips 121 to 12N may transmit the local interrupt signals to the interrupt signal wire IRW and generate a common interrupt signal IR by performing a logic operation on the local interrupt signals. The memory chips 121 to 12N may be coupled to the interrupt signal wire IRW in a wired AND manner, so that the memory chips 121 to 12N may generate the common interrupt signal IR by performing an AND operation on the local interrupt signals and transmit the common interrupt signal IR to the controller 110.

In this embodiment, the common interrupt signal IR may be configured to display a busy status and an idle status of the memory chips 121 to 12N. In detail, each local interrupt signal generated by each of the memory chips 121 to 12N is configured to indicate a completion status of an operation command of each of the corresponding memory chips 121 to 12N. Taking the memory chip 121 as an example, when the memory chip 121 receives an operation command (e.g., a data access command), the memory chip 121 may be in a busy status to perform a data access action. Herein, the memory chip 121 may make the generated local interrupt signal at a logic 1. Further, when the memory chip 121 is in an idle status in which the operation command has been completed, the memory chip 121 may pull down the generated local interrupt signal to a logic 0. Based on the common interrupt signal IR being the result of the AND logic operation of all the local interrupt signals, the common interrupt signal IR may be pulled down to the logic 0 correspondingly. Conversely, if the memory chip 121 is in a busy status in which the operation command has not been completed, the memory chip 121 may keep the generated local interrupt signal at the logic 1.

That is, in this embodiment, when the event that the common interrupt signal IR is pulled down to the logic 0 occurs, the controller 11 may know that at least one of the memory chips 121 to 12N has completed the operation command to be executed and is in an idle status.

On the other hand, when the controller 110 detects that the common interrupt signal IR is pulled down to the logic 0, the controller 110 may perform a status query action on the memory chips 121 to 12N. Herein, by enabling one of the chip selection signals CS1 to CSN, the controller 110 may select one of the memory chips 121 to 12N as the selected memory chip (e.g., the memory chip 121) and may transmit a status read command to the memory chip 121 through the data bus DBUS to read the idle or busy status of the memory chip 121.

When the memory chip 121 receives the status read command, if the memory chip 121 is in the idle status in which the operation command has been completed, idle information may be transmitted to the controller 110 through the data bus DBUS. In contrast, if the memory chip 121 is in the busy status in which the operation command has not been completed, busy information may be transmitted to the controller 110 through the data bus DBUS. Further, if the memory chip 121 is in the idle status in which the operation command has been completed, the local interrupt signal generated by the memory chip 121 may be cleared according to the received status read command, and the generated local interrupt signal is set to the logic 1.

In this embodiment, the controller 110 may sequentially set each of the memory chips 121 to 12N as the selected memory chip, send a status read command to each of the memory chips 121 to 12N in sequence, and to accordingly inquire about the idle or busy status of all the memory chips 121 to 12N.

Besides, regarding the sending time point of the status read command, the controller 110 may estimate the time required for the selected memory chip to complete the operation command, and send the status read command to the selected memory chip based on the time when the operation command is sent to the selected memory chip. In this way, the number of times the controller 110 inquires about the idle or busy statuses of the memory chips 121 to 12N may be reduced, and the power consumption may thus be saved.

When the local interrupt signals generated by all the memory chips 121 to 12N are cleared to the logic 1, the common interrupt signal IR may be restored to the logic 1.

In this embodiment, the number of the memory channel MC may be one or more, which is neither fixed nor limited. The memory chips 121 to 12N included in the memory channel MC may be any form of memory chips known to a person having ordinary skill in the art, such as a single level cell (SLC) or multi-level cell (MLC) NAND flash memory chip, a NOR flash memory, a random access memory, and the like.

Figure 1B:
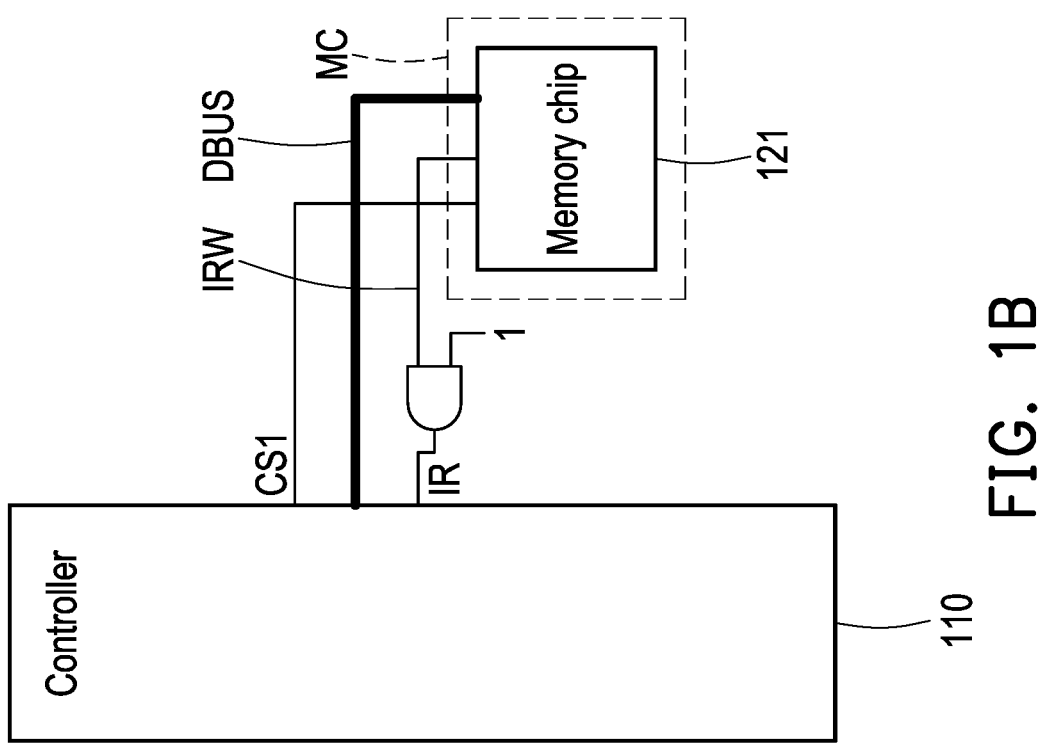
FIG. 1B is a schematic diagram illustrating a memory device according to another embodiment of the disclosure.

With reference to FIG. 1B, FIG. 1B is another schematic diagram illustrating a memory device according to an embodiment of the disclosure. Different from the memory device 100 in FIG. 1A, the memory channel MC of the memory device 100 in FIG. 1B may be formed by a single one memory chip 121. The memory channel MC is coupled to the controller 110 through the interrupt signal wire IRW, the data bus DBUS and the chip selection signal line. The memory chip 121 receives the chip selection signal CS1. The memory chip 121 is coupled to the interrupt signal wire IRW, transmits a local interrupt signal to the interrupt signal wire IRW and generates the common interrupt signal IR by performing a logic operation (AND operation) on the local interrupt signal with the logic 1.

Figure 2A:
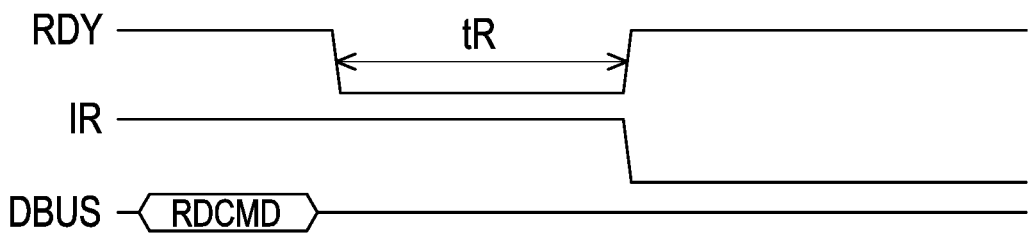
FIG. 2A to FIG. 2C are waveform graphs illustrating actions of the memory device according to an embodiment of the disclosure.
Figure 2B:
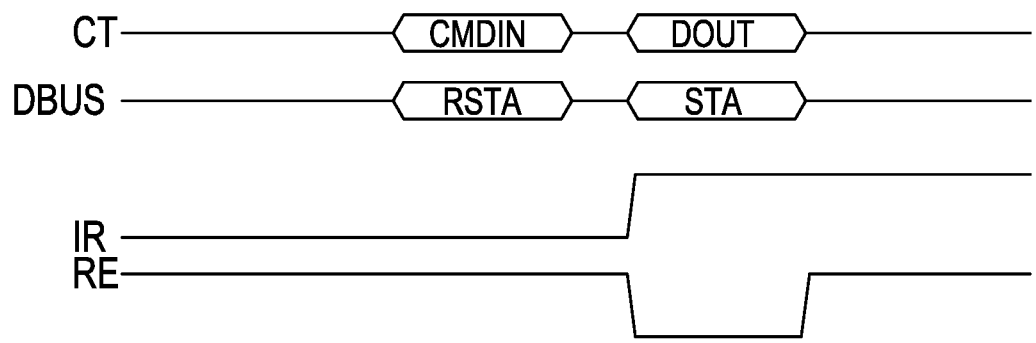
Figure 2C:
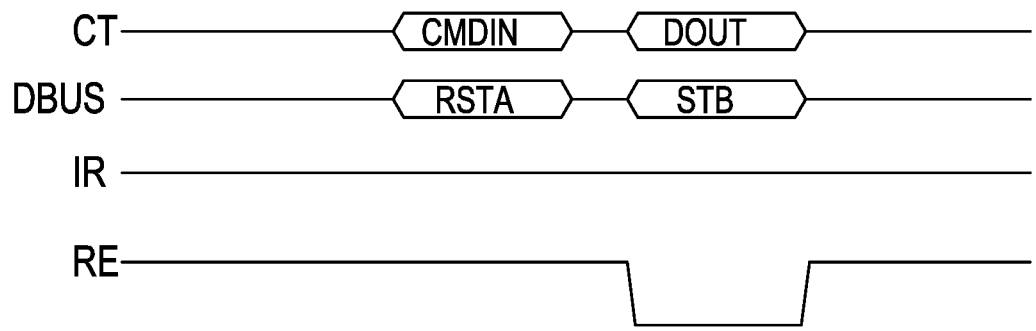

Referring to FIG. 2A to FIG. 2C, FIG. 2A to FIG. 2C are waveform graphs illustrating actions of the memory device according to an embodiment of the disclosure. With reference to FIG. 1 together, in FIG. 2A, the controller 110 provides an operation command RDCMD of the read command to the selected memory chip through the data bus DBUS. After the selected memory chip receives the operation command RDCMD, an internal ready signal RDY thereof is pulled down to a logic 0, and after a time delay tR, after the operation command RDCMD is completed, the internal ready signal RDY is pulled high to a logic 1. Based on the completion of the operation command RDCMD, the selected memory chip may pull down its generated local interrupt signal and further cause the common interrupt signal IR to be pulled low to the logic 0.

In FIG. 2B, under the condition that the common interrupt signal IR is at the logic 0, when a time cycle CT is an operation command transmission cycle CMDIN, the controller 110 transmits a status read command RSTA to the selected memory chip through the data bus DBUS. If the selected memory chip is in the idle status where the operation command has been completed, the selected memory chip can transmit idle information STA in the idle status to the controller 110 through the data bus DBUS when the time cycle CT is the data output cycle DOUT. Moreover, the selected memory chip can correspond to the status read command RSTA to clear the generated local interrupt signal to the logic 1 and further change the status of the common interrupt signal to the logic 1.

In FIG. 2C, under the condition that the common interrupt signal IR is at the logic 1, when the time cycle CT is the operation command transmission cycle CMDIN, the controller 110 transmits the status read command RSTA to the selected memory chip through the data bus DBUS. If the selected memory chip is in the busy status where the operation command has not been completed, the selected memory chip can transmit busty information STA in the busy status to the controller 110 through the data bus DBUS when the time cycle CT is the data output cycle DOUT. Herein, the common interrupt signal can maintain at the logic 1.

Figure 3:
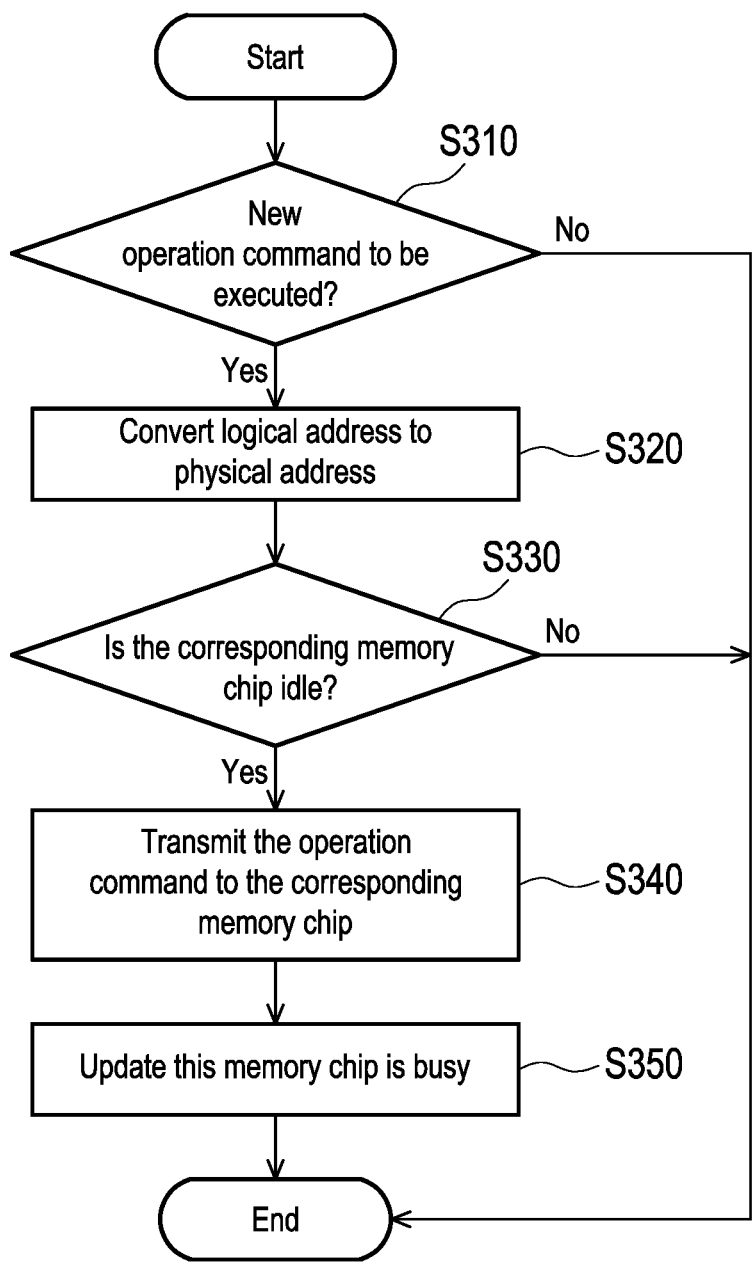
FIG. 3 is a flow chart illustrating a recording action of an idle status or a busy status of a memory chip of the memory device according to an embodiment of the disclosure.

With reference to FIG. 3, FIG. 3 is a flow chart illustrating a recording action of an idle status or a busy status of a memory chip of the memory device according to an embodiment of the disclosure. With reference to FIG. 1 together, in step S310, the controller 110 determines whether there is a new operation command to be executed. If the controller 110 determines that there is no new operation command to be executed, the process can be ended. If the controller 110 determines that there is a new operation command to be executed, step S320 can be performed. In step S320, the controller 110 converts the logical address corresponding to the operation command to obtain the physical address of the memory chip that executes the operation command. Next, in step S330, the controller 110 can determine whether the memory chip corresponding to the operation command is in an idle status, and if the memory chip is not in an idle status, the process can be ended. Conversely, if the memory chip is in an idle status, step S340 can be performed.

In step S340, the controller 110 sends the operation command to the corresponding memory chip. Further, in step S350, the controller 110 can record that the memory chip is in a busy status, and the process can be ended.

Figure 4:
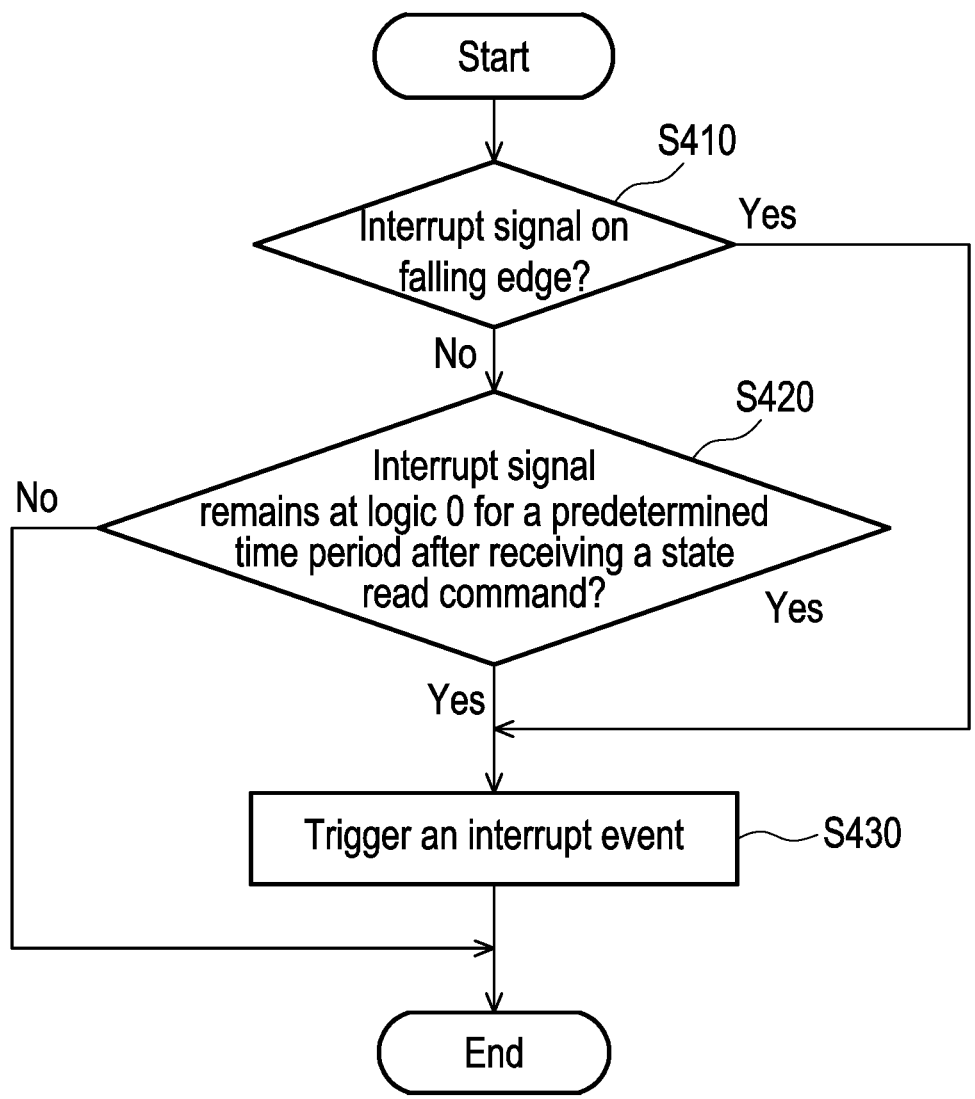
FIG. 4 is a flow chart illustrating a triggering action of an interrupt event of the memory device according to an embodiment of the disclosure.

With reference to FIG. 4, FIG. 4 is a flow chart illustrating a triggering action of an interrupt event of the memory device according to an embodiment of the disclosure. With reference to FIG. 1 again, in step S410, the controller 110 may determine whether the interrupt signal IR is on the falling edge, and if the determination result is yes, step S430 may be performed to trigger an interrupt event. Herein, when the interrupt signal IR has a falling edge for the first time (transition from a logic 1 to a logic 0), the controller 110 can directly execute step S430 to trigger an interrupt event.

After the interrupt event is triggered, the controller 110 may issue a status read command to the memory chips 121 to 12N.

Conversely, if the determination result in step S410 is no, the controller 110 may determine whether the interrupt signal IR remains at the logic 0 after a predetermined time period after the memory chips 121 to 12N receive the status read command. If the interrupt signal IR remains at the logic 0, the controller 110 can directly execute step S430 to trigger an interrupt event. If the interrupt signal IR does not remain at the logic 0, the process can be ended.

Figure 5:
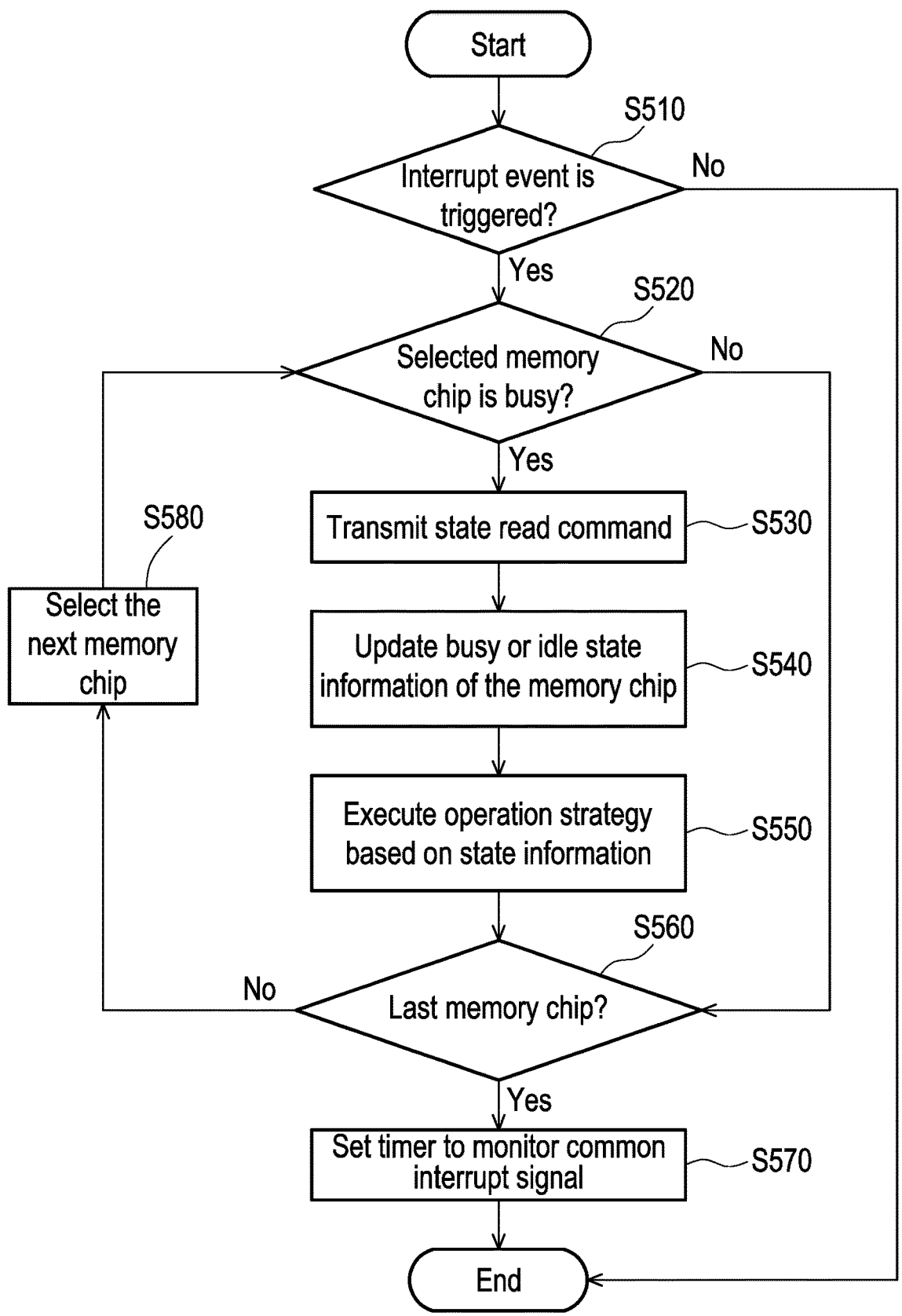
FIG. 5 is a flow chart illustrating the actions of the interrupt event of FIG. 4 according to an embodiment of the disclosure.

With reference to FIG. 5, FIG. 5 is a flow chart illustrating the actions of the interrupt event of FIG. 4 according to an embodiment of the disclosure. After step S430 is executed to trigger an interrupt event, the flow of steps in FIG. 5 may be performed. Herein, the controller 110 determines in step S510 whether the interrupt event is triggered, if so, step S520 is performed, otherwise, the process ends. Next, the controller 110 may select one of the memory chips 121 to 12N as the selected memory chip and determine whether the selected memory chip is busy (step S520). If the determination result is yes, the controller 110 may transmit a status read command to the selected memory chip (step S530) and perform an update action of the idle or busy status of the memory chip in step S540. Herein, by transmitting the status read command to the selected memory chip, the local interrupt signal transmitted by the selected memory chip may be cleared, and the controller 110 may record the status that the selected memory chip has been idle in search information.

If the determination result of the controller 110 in step S520 is no, step S560 may be performed.

In this embodiment, the search information may be recorded by using a register in the controller 110 or may be recorded by using a built-in memory or an external memory, which is not particularly limited.

In step S550, the controller 110 may execute the operation strategy of the memory chips 121 to 12N according to the latest status information.

In step S560, the controller 110 may determine whether the selected memory chip is the last memory chip, and if so, a step S570 can be executed. If the determination result is no, the controller 110 may select the next memory chip and execute step S520 again.

In the step S570, a preset time can be set, and a timer can be set to check whether the common interrupt signal is still at logic 0 or not at a time point after the preset time.

Figure 6:
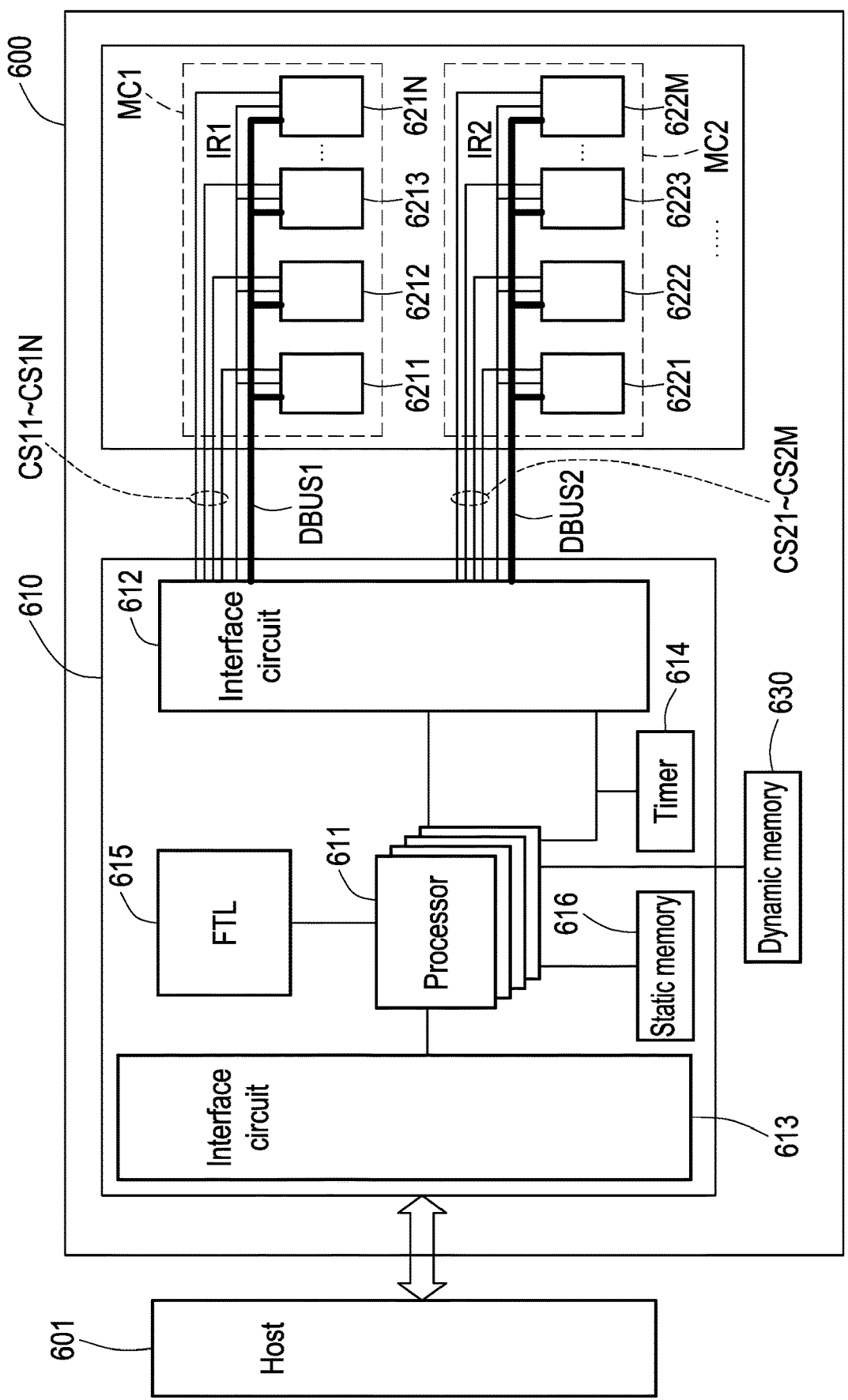
FIG. 6 is a block diagram of a memory device according to another embodiment of the disclosure.

With reference to FIG. 6, FIG. 6 is a block diagram of a memory device according to another embodiment of the disclosure. A memory device 600 may be a solid state drive and is coupled to a host 601. The memory device 600 includes a controller 610 and memory channels MC1 and MC2. The memory channel MC1 has memory chips 6211 to 621N, and the memory chips 6211 to 621N generate a common interrupt signal IR1 through a common interrupt signal wire. The controller 610 performs data transmission with the memory chips 6211 to 621N through a data bus DBUS1, and the controller 610 performs operation by selecting one of the memory chips 6211 to 621N through chip selection signals CS11 to CS1N. The memory channel MC2 has memory chips 6221 to 622M, and the memory chips 6221 to 622M generate a common interrupt signal IR2 through another common interrupt signal wire. The controller 610 performs data transmission with the memory chips 6221 to 622M through data bus DBUS2, and the controller 610 performs operation by selecting one of the memory chips 6221 to 622M through chip selection signals CS21 to CS2M. Herein, the number of the memory chips 6211 to 621N in the memory channel MC1 may be the same or different from the number of the memory chips 6221 to 622M in the memory channel MC2.

In this embodiment, the controller 610 includes a plurality of processors 611, interface circuits 612 and 613, a timer 614, a flash translation layer (FTL) 615, and a static memory 616. The processors 611 are coupled to the interface circuit 612 and are coupled to the host 601 through the interface circuit 612. The processors 611 are coupled to the interface circuit 613 and are coupled to the memory channels MC1 and MC2 through the interface circuit 613. The processors 611 are used for sending a plurality of operation commands to the memory channels MC1 and MC2 according to the needs of the host 601 and performing data access operations on the memory chips 6211 to 622M in the memory channels MC1 and MC2.

The controller 610 may be configured to execute the action flows of the foregoing embodiments and thereby record the idle or busy statuses of the memory chips 6211 to 622M in the memory channels MC1 and MC2.

In addition, the timer 614 is coupled to the processors 611. The timer 614 may perform a timing operation according to a predetermined time and accordingly generate a time point after the predetermined time for checking whether the common interrupt signal is still at logic 0 or not.

Incidentally, the processors 611 in the controller 610 may also be coupled to an external dynamic memory 630 and use the dynamic memory 630 to access temporary data.

Figure 7:
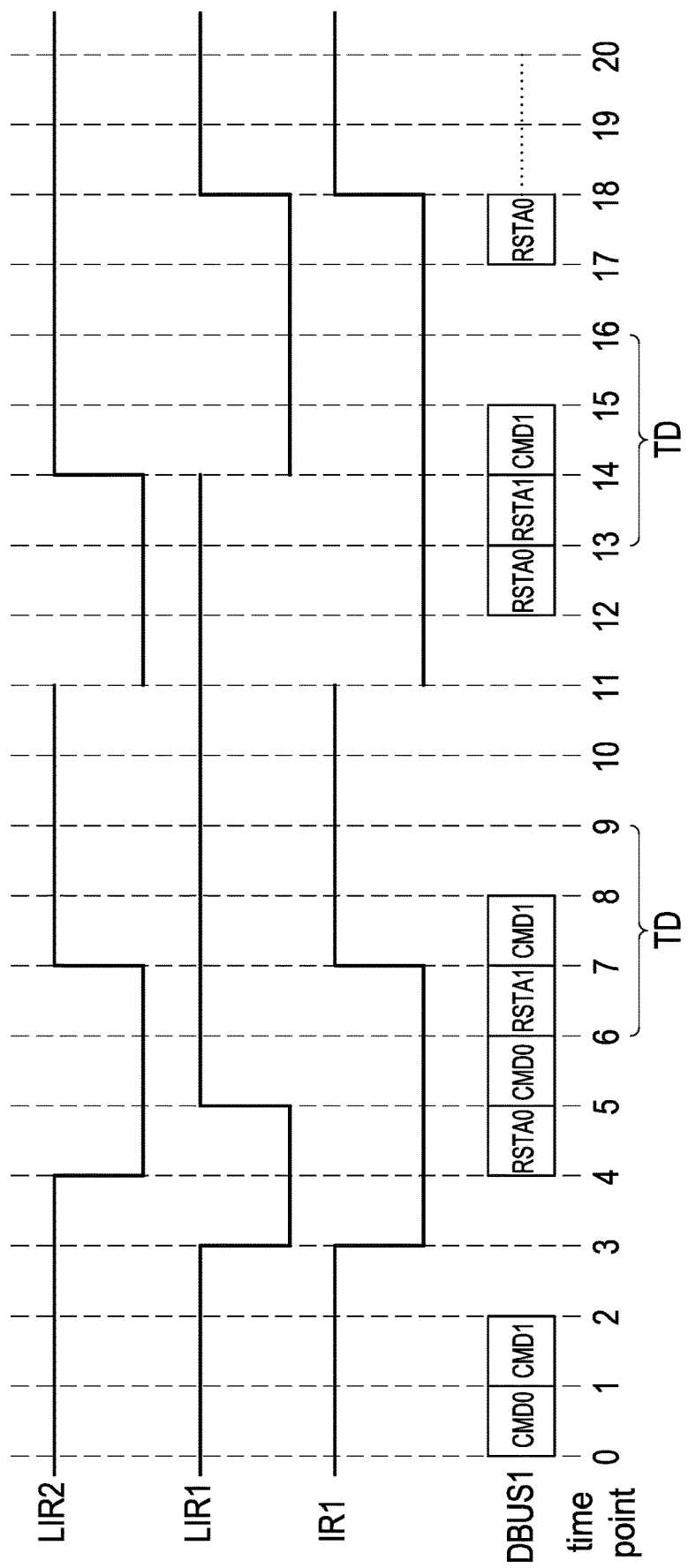
FIG. 7 is a waveform graph illustrating a management method of a memory chip of the memory device.

Regarding the action mode of the memory device, reference may be made to FIG. 7, which is a waveform graph illustrating a management method of a memory chip of the memory device. Herein, with reference to FIG. 6 together, the memory chips 6211 and 6212 in the memory channel MC1 are taken as an example. Herein, the memory chips 6211 and 6212 respectively generate local interrupt signals LIR1 and LIR2. The common interrupt signal IR1 is the result of the logic operation of the local interrupt signals LIR1 and LIR2.

In FIG. 7, at time points 0 and 1, the controller 610 sequentially sends operation commands CMD0 to the memory chip 6211 and CMD1 to the memory chip 6212 through the data bus DBUS1. At time point 3, the memory chip 6211 has completed the operation command CMD0 and caused the generated local interrupt signal LIR1 to be pulled low to a logic 0. At this time, the common interrupt signal IR1 is correspondingly pulled down to the logic 0 and generates a falling edge.

Next, at time point 4, the memory chip 6212 has completed the operation command CMD1 and caused the generated local interrupt signal LIR2 to be pulled low to the logic 0. At the same time, the controller 610 sends a status read command RSTA0 to the memory chip 6211 through the data bus DBUS1.

Since at time point 4, the memory chip 6211 has completed the operation command CMD0 and is in an idle status, the memory chip 6211 corresponds to the status read command RSTA0 to clear the generated local interrupt signal LIR1 to a logic 1 at time point 5. On the other hand, at time point 5, based on the fact that the memory chip 6211 is in an idle status, the controller 610 may send the operation command CMD0 to the memory chip 6211 through the data bus DBUS1 again.

At time point 6, the controller 610 sends the status read command RSTA1 to the memory chip 6212 through the data bus DBUS1. At time point 7, the memory chip 6212 corresponds to the status read command RSTA1 to clear the generated local interrupt signal LIR2 to the logic 1. The common interrupt signal IR1 also transitions to the logic 1 at time point 7. It is worth mentioning that the controller 610 may check whether the common interrupt signal IR1 is the logic 1 at a time point 9 after a predetermined time TD (e.g., equal to 2) based on the status read command RSTA1 sent at the time point 6.

At time point 7, the controller 610 sends the operation command CMD1 to the memory chip 6212. After time points 8 to 10, at the time point 11, based on the memory chip 6211 having completed the operation command CMD1, the local interrupt signal LIR2 and the common interrupt signal IR1 are simultaneously changed to the logic 0 at the time point 11. Next, at time points 12 and 13, the controller 610 sends the status read commands RSTA0 and RSTA1 to the memory chips 6211 and 6212 in sequence. At time point 14, based on the fact that the memory chip 6211 has completed the operation command CMD0 received at time point 5, the memory chip 6211 thereby pulls down the generated local interrupt signal LIR1.

Herein, the controller 610 may check whether the common interrupt signal IR1 is the logic 1 at a time point 16 after the predetermined time TD based on the status read command RSTA1 sent at the time point 13. Since the common interrupt signal IR1 is not the logic 1 at this time, the controller 610 may send the status read command RSTA0 to the memory chip 6211 at the time point 17 after the time point 16, clear the local interrupt signal LIR1 generated by the memory chip 6211 at the time point 18 to the logic 1, and correspondingly make the common interrupt signal IR1 at the logic 1.

Figure 8:
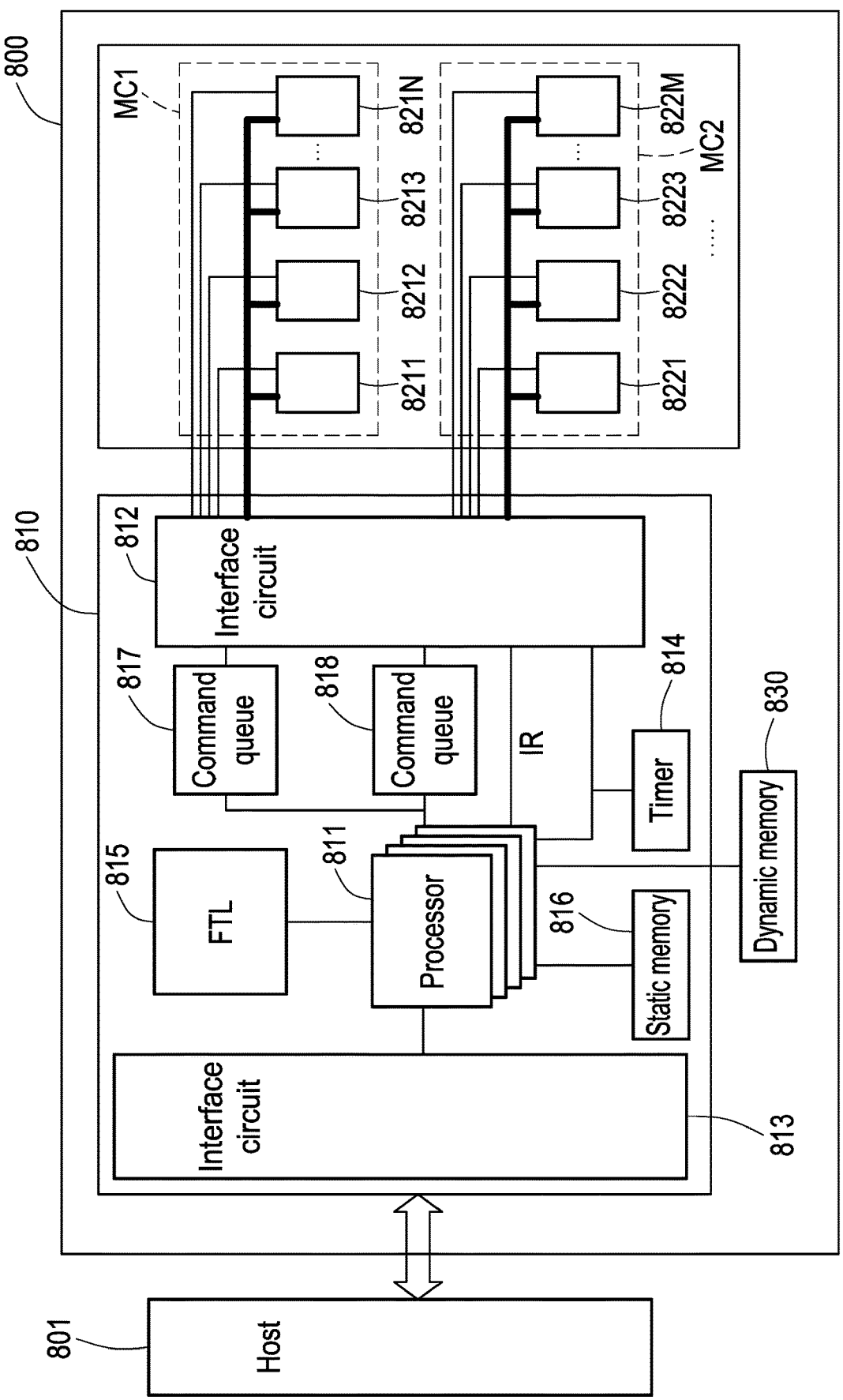
FIG. 8 is a block diagram of a memory device according to another embodiment of the disclosure.

With reference to FIG. 8, FIG. 8 is a block diagram of a memory device according to another embodiment of the disclosure. A memory device 800 may be a solid state drive and is coupled to a host 801. The memory device 800 includes a controller 810 and memory channels MC1 and MC2. The memory channel MC1 has memory chips 8211 to 821N, and the memory chips 8211 to 821N generate a common interrupt signal IR1 through a common interrupt signal wire. The memory channel MC2 has memory chips 8221 to 822M, and the memory chips 8221 to 822M generate a common interrupt signal IR2 through another common interrupt signal wire. Herein, the number of the memory chips 8211 to 821N in the memory channel MC1 may be the same or different from the number of the memory chips 8221 to 822M in the memory channel MC2.

In this embodiment, the controller 810 includes a plurality of processors 811, interface circuits 812 and 813, a timer 814, a flash translation layer (FTL) 815, a static memory 816, and command queues 817 and 818. Different from the embodiment shown in FIG. 6, the command queues 817 and 818 are provided in the memory device 800 of this embodiment. The command queues 817 and 818 may be implemented through a first in, first out (FIFO) circuit. The command queues 817 and 818 are coupled between the processors 811 and the interface circuit 812 and respectively correspond to the memory channels MC1 and MC2.

In present embodiment, the processor 811 writes each of the operation commands and each of the operation completion times of the operation commands to the command queue 817 or 818, where each of the operation commands may be read operation, write operation or erase operation. The command queue 817 or 818 sends the operation commands and the operation completion times to the memory chips 8211 to 821N or the memory chips 8221 to 822N. Besides, the interface circuit 812 writes the operation completion time of corresponding operation command to the timer 814. The timer 814 informs the interface circuit 812 after the timing operation was finished to set the interface circuit 812 to transmit a status read command for reading operation statuses of the memory chips 8211 to 821N or the memory chips 8221 to 822N. Moreover, the processor 811 may trigger an interrupt event after operations of the operation commands are complete.

Figure 9:
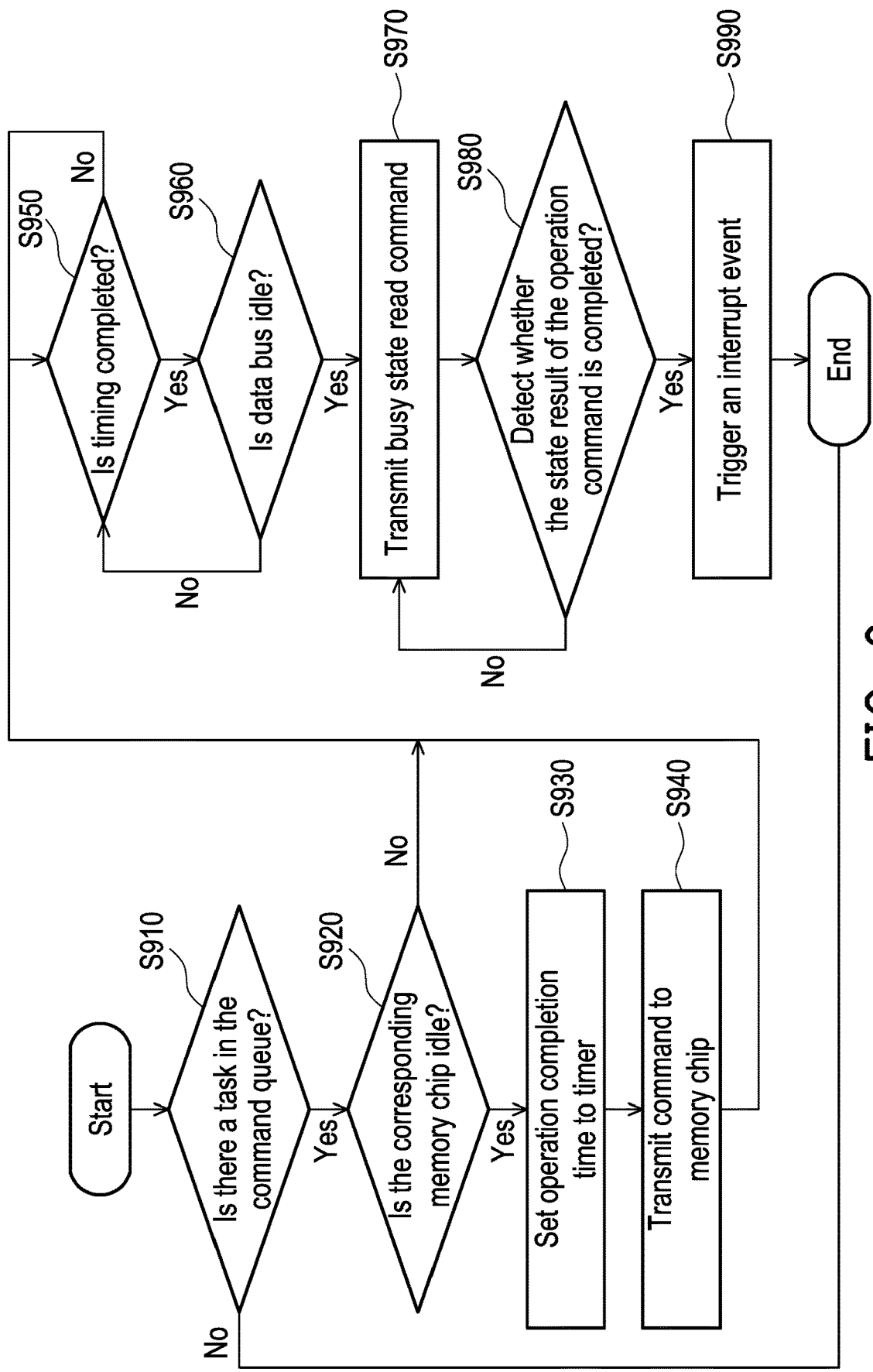
FIG. 9 is a flow chart illustrating the actions of the memory device of FIG. 8 according to an embodiment of the disclosure.

With reference to FIG. 9, FIG. 9 is a flow chart illustrating the actions of the memory device of FIG. 8 according to an embodiment of the disclosure. Herein, in step S910, the controller can determine whether there is a task in the command queue (whether there is a storage operation command), and if there is no task in the command queue, the process can be ended. If there is a task in the command queue, the controller may execute step S920 to determine whether the memory chip corresponding to the operation command in the command queue is idle. Step S930 may be executed if the corresponding memory chip is idle, and step S950 may be executed if the corresponding memory chip is busy.

In step S930, the controller can read out the operation completion time of the corresponding operation command in the command queue and set the operation completion time into the timer. In step S940, the controller can send the operation command to the corresponding memory chip.

In step S950, the controller determines whether the timer completes the timing operation and determines whether the data bus is idle after the timer completes the timing operation. When the data bus is idle, the status read command is sent to the corresponding memory chip.

In step S980, the controller checks whether the corresponding memory chip completes the status result of the operation command through the status read command. Step S970 is re-executed when the operation command has not been completed, and step S990 is executed when the operation command has been completed. The controller may trigger an interrupt event in step S990.

After the interrupt event is triggered, the controller may determine whether the operation commands received by the command queue are all completed and may execute the relevant access strategy according to the status information of the memory chip.

Figure 10:
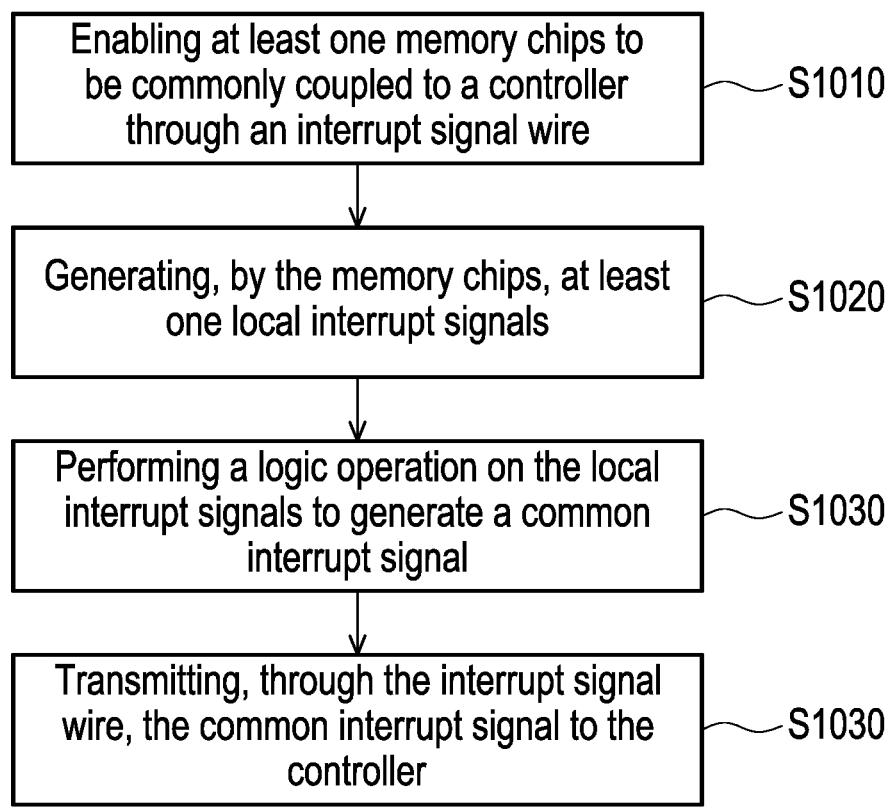
FIGS. 10 and 11 are flow charts illustrating different management methods of a memory device according to an embodiment of the disclosure.

With reference to FIG. 10, FIG. 10 is a flow chart illustrating a management method of a memory device according to an embodiment of the disclosure. Herein, in step S1010, at least one memory chip is commonly coupled to a controller through an interrupt signal wire. In step S1020, the memory chip generate at least one local interrupt signal. In step S1030, the memory chip may perform a logic operation on the local interrupt signal in a wired AND manner to generate a common interrupt signal. In step S1040, the interrupt signal wire transmits the common interrupt signal to the controller.

Details of the above steps are described in the foregoing embodiments, and a relevant description thereof is thus omitted.

Figure 11:
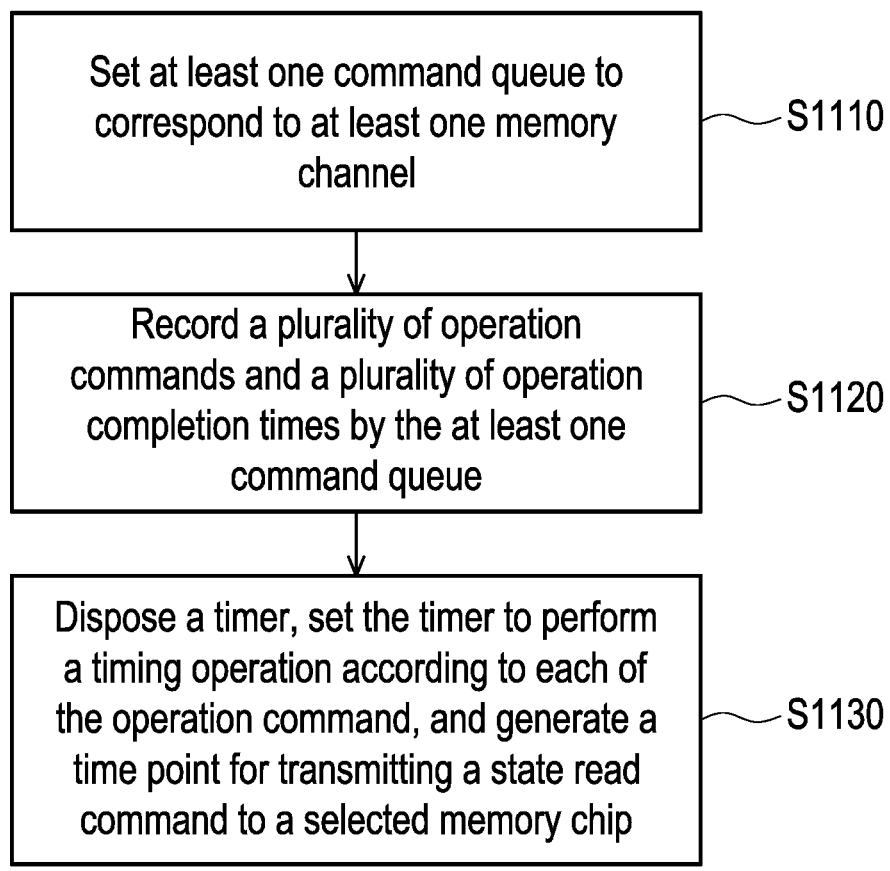

With reference to FIG. 11, FIG. 11 is another flow chart illustrating a management method of a memory device according to an embodiment of the disclosure. In step S1110, at least one command queue is set to correspond to at least one memory channel, where the memory channel may include one or a plurality of memory chips. In step S1120, a plurality of operation commands and a plurality of operation completion times are recorded by the at least one command queue. In step S1130, a timer is disposed, the timer is set to perform a timing operation according to each of the operation command and generate a time point for transmitting a status read command to a selected memory chip.

Details of the above steps are described in the foregoing embodiments, and a relevant description thereof is thus omitted.

In view of the foregoing, in the embodiments of the disclosure, each memory chip may pull down the interrupt signal by pulling down the generated local interrupt signal. The controller may query the idle or busy status of each memory chip in response to the pull-down of the interrupt signal. In this way, the memory device may inquire about the idle or busy status of each memory chip at an appropriate time, so that power consumption may be effectively saved, and the working performance of the memory device may be improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A memory device, comprising:
a controller; and
at least one memory channel, comprising:
at least one memory chip, commonly coupled to the controller through an interrupt signal wire, wherein the at least one memory chip generate at least one local interrupt signal and performs a logic operation on the at least one local interrupt signal to generate a common interrupt signal, and the interrupt signal wire is configured to transmit the common interrupt signal to the controller,
wherein each of the local interrupt signals is configured to indicate a completion status of an operation command of each of the at least one memory chip, the logic operation is a logic AND operation, the corresponding local interrupt signal is at a logic 0 when each of the at least one memory chip has completed the operation command and is in an idle status, and the corresponding local interrupt signal is at a logic 1 when each of the at least one memory chip has not completed the operation command and is in a busy status.

2. The memory device according to claim 1, wherein when the at least one memory chip is in the busy status, the common interrupt signal is at the logic 1.

3. The memory device according to claim 1, wherein when at least one of the at least one memory chip is in the idle status, the common interrupt signal is at the logic 0.

4. The memory device according to claim 1, wherein the controller is further coupled to the at least one memory chip through a data bus and transmits at least one chip selection signal to the at least one memory chip through at least one chip selection signal line.

5. The memory device according to claim 4, wherein when the common interrupt signal is changed to a set logic value, the controller transmits a status read command to a selected memory chip through the data bus.

6. The memory device according to claim 5, wherein when the selected memory chip is in an idle status, the selected memory chip corresponds to the status read command to reply a piece of idle information and clear the corresponding local interrupt signal.

7. The memory device according to claim 5, wherein when the selected memory chip is in a busy status, the selected memory chip corresponds to the status read command to reply a piece of busy information and keeps the corresponding local interrupt signal unchanged.

8. The memory device according to claim 1, wherein the controller further records the idle or busy status of each of the at least one memory chip.

9. A management method of a memory device, comprising:
enabling at least one memory chip to be commonly coupled to a controller through an interrupt signal wire;
generating, by the at least one memory chip, at least one interrupt signal;
performing a logic operation on the at least one local interrupt signal to generate a common interrupt signal; and
transmitting, through the interrupt signal wire, the common interrupt signal to the controller,
wherein the logic operation is a logic AND operation, the corresponding local interrupt signal is set to a logic 0 when each of the at least one memory chip has completed the operation command and is in an idle status, and the corresponding local interrupt signal is set to a logic 1 when each of the at least one memory chip has not completed the operation command and is in a busy status.

10. The management method of the memory device according to claim 9, wherein each of the at least one local interrupt signal is configured to indicate a completion status of an operation command of each of the at least one memory chip.

11. The management method of the memory device according to claim 9, wherein the common interrupt signal is at the logic 1 when the at least one memory chip is in the busy status, and the common interrupt signal is at the logic 0 when at least one of the at least one memory chip is in the idle status.

12. The management method of the memory device according to claim 9, further comprising:

transmitting, through a data bus, a status read command to a selected memory chip according to an operation completion time together with a corresponding chip selection signal when the common interrupt signal is changed to a set logic value.

13. The management method of the memory device according to claim 12, further comprising:

enabling the selected memory chip to correspond to the status read command to reply a piece of idle information and clear the corresponding local interrupt signal when the selected memory chip is in an idle status.

14. The management method of the memory device according to claim 12, wherein enabling the selected memory chip to correspond to the status read command to reply a piece of busy information and keep the corresponding local interrupt signal unchanged when the selected memory chip is in a busy status.

15. A memory device, comprising:

a controller; and at least one memory channel, comprising:

at least one memory chip, commonly coupled to the controller through an interrupt signal wire, wherein the at least one memory chip generates at least one local interrupt signal and performs a logic operation on the at least one local interrupt signal to generate a common interrupt signal, and the interrupt signal wire is configured to transmit the common interrupt signal to the controller, wherein the controller is further coupled to the at least one memory chip through a data bus and transmits at least one chip selection signal to the at least one memory chip through at least one chip selection signal line, when the common interrupt signal is changed to a set logic value, the controller transmits a status read command to a selected memory chip through the data bus.

* * * * *